(12) United States Patent
Kraus et al.

(10) Patent No.: US 7,226,377 B2
(45) Date of Patent: Jun. 5, 2007

(54) TENSIONER WITH ADJUSTABLE BIASING FORCE OF A TRACTION MEMBER

(75) Inventors: Manfred Kraus, Herzogenaurach (DE); Michael Bogner, Eckental (DE)

(73) Assignee: INA-Schaeffler KG, Herzogenaurach (DE)

( * ) Notice: Subject to any disclaimer, the term of this patent is extended or adjusted under 35 U.S.C. 154(b) by 361 days.

(21) Appl. No.: 10/806,068

(22) Filed: Mar. 22, 2004

(65) Prior Publication Data

US 2004/0227400 A1 Nov. 18, 2004

Related U.S. Application Data

(63) Continuation of application No. PCT/EP02/09378, filed on Aug. 22, 2002.

(30) Foreign Application Priority Data

Sep. 21, 2001 (DE) .............................. 101 46 612

(51) Int. Cl.
*F16H 7/08* (2006.01)
*F16H 7/12* (2006.01)

(52) U.S. Cl. .................... 474/135; 474/133; 474/117

(58) Field of Classification Search ........ 474/102–106, 474/109–110, 112, 117, 133–138
See application file for complete search history.

(56) References Cited

U.S. PATENT DOCUMENTS

| | | | | |
|---|---|---|---|---|
| 660,570 A | * | 10/1900 | Green | ........................ 474/135 |
| 4,500,303 A | * | 2/1985 | Sermersheim et al. | ...... 474/112 |
| 4,571,223 A | * | 2/1986 | Molloy | ........................ 474/133 |
| 4,713,045 A | * | 12/1987 | Kodama et al. | ............ 474/135 |
| 5,064,405 A | | 11/1991 | St. John | |
| 5,176,581 A | | 1/1993 | Kumm | |
| 5,702,315 A | * | 12/1997 | Sakai et al. | ................... 474/94 |
| 6,478,701 B1 | * | 11/2002 | Yasuhara et al. | ........... 474/133 |
| 6,572,501 B2 | * | 6/2003 | Winklhofer | .................. 474/102 |
| 6,688,022 B2 | * | 2/2004 | Hanafusa et al. | ........... 474/109 |
| 6,953,407 B2 | * | 10/2005 | Kitamura et al. | ........... 474/135 |

FOREIGN PATENT DOCUMENTS

| | | |
|---|---|---|
| DE | 40 33 777 A | 4/1992 |
| DE | 41 14 716 A1 | 11/1992 |
| DE | 43 43 429 A1 | 6/1995 |
| DE | 196 04 182 A1 | 9/1996 |

(Continued)

*Primary Examiner*—Marcus Charles
(74) *Attorney, Agent, or Firm*—Henry M. Feiereisen (57) ABSTRACT

A tensioner for a traction member, in particular a belt of a traction drive for an internal combustion engine, includes a base constructed for rotation about a rotation axis and having a pivot arm. The pivot arm has a free end for connection of a rotatable tension roller which bears against a traction member. A spring member urges the pivot arm to seek a forced engagement of the tension roller upon the traction member. Disposed between the base and the pivot arm is a damping element for damping an adjusting movement of the pivot arm. A pivot bearing supporting one portion of the base on a machine part for rotation about the rotation axis, whereby the rotation of the base in relation to the machine part is realized by an actuator to thereby adjust a biasing force of the traction member.

18 Claims, 8 Drawing Sheets

FOREIGN PATENT DOCUMENTS

| | | |
|---|---|---|
| DE | 198 45 710 A1 | 4/2000 |
| DE | 101 18 277 A | 10/2002 |
| EP | 06 76 537 B1 | 12/1998 |
| EP | 11 22 464 A1 | 8/2001 |
| JP | 60-19850 A * | 2/1985 |
| JP | 01 093656 A | 4/1989 |
| JP | 01 135952 A | 5/1989 |
| WO | WO 00 57 083 A1 | 9/2000 |
| WO | WO 02 48577 A | 6/2002 |

* cited by examiner

TENSIONER WITH ADJUSTABLE BIASING FORCE OF A TRACTION MEMBER

CROSS-REFERENCES TO RELATED APPLICATIONS

This application is a continuation of prior filed copending PCT International application no. PCT/EP02/09378, filed Aug. 22, 2002, which designated the United States and on which priority is claimed under 35 U.S.C. §120, the disclosure of which is hereby incorporated by reference.

This application claims the priority of German Patent Application, Serial No. 101 46 612.9, filed Sep. 21, 2001, pursuant to 35 U.S.C. 119(a)–(d), the disclosure of which is incorporated herein by reference.

BACKGROUND OF THE INVENTION

The present invention relates to a tensioner for a traction member, in particular a belt of a traction drive.

Tensioners of a type involved here are used in particular in internal combustion engines for motor vehicles to ensure a slip-free drive of accessories or units that are propelled by the traction drive during start-up operation as well as generator operation, without affecting the speed pattern of the traction drive. The traction drive is hereby operated off the engine crankshaft and connects pulleys of the accessories that need to be propelled. Oftentimes, internal combustion engines include two traction drives, whereby one traction drive represents the control mechanism for driving the camshaft(s), and the other traction drive is used as accessory drive for operating, e.g., a water pump, injection pump, air conditioning compressor, servo devices and other accessories. As a consequence of an increase in length of the traction member and an uneven rotation of the crankshaft, caused by the combustion process of the internal combustion engine, dynamic effects, such as vibrations of the traction member, are encountered. Moreover, the material of the traction member undergoes a temperature-based change so that the biasing force of the traction member, i.e. the belt tension, changes especially at high or low limit temperatures. Due to aging and wear, belts have a tendency to stretch so that the initially set tension of the traction member decreases.

German patent publication no. DE 198 45 710 A1 describes a tensioner having a base which is fixedly mounted to a machine part. A tensioner arm includes a hub which is supported on a pin of the base for connection of the tensioner arm via a shaft with the base. With its free, the tensioner arm is resiliently supported upon the traction member via a rotatable tension roller. In the area of the shaft, one end of the pin carries a radial flange, with a friction lining or friction disk disposed between end surfaces of the radial flange and the hub of the tensioner arm and operating as damping element to dampen an adjusting movement of the tensioner arm.

The tensioner according to German patent publication no. DE 43 43 429 A1 is detachably secured to a housing of an internal combustion engine. A shaft is provided between the base and the tensioner arm and surrounded by a torsion spring having one spring end secured to the base and another spring end secured to the tensioner arm. The torsion spring surrounds hereby a central portion of the base for swingable support of the bearing pin of the tensioner arm via a bearing in the form of a slide bearing sleeve. The tensioner arm is axially supported by the base via a radial flange which is disposed on one end of the bearing pin and supported by an end face of the base through intervention of a friction lining which further assumes the function of a damping element. The free end of the tensioner arm carries a rotatable tension roller which resiliently rests against the traction member.

Conventional tensioners are dimensioned for a maximally transmittable torque of the accessories, e.g. 100% generator load. Apart from the fact that the life of the traction member is adversely affected thereby, there are other negative consequences. Because conventional tensioners are dimensioned for maximum load conditions, an excessive biasing force is applied, even though the accessories may operate at reduced load, e.g. during idling of the internal combustion engine. In other words, the required biasing force is less than the actually applied biasing force, rendering the traction drive overly taut. On the other hand, when the biasing force is too low at high moments, an increased slip between the traction member and the pulleys is encountered. Thus, conventional tensioners are constructed to attain a compromise in order to reconcile the dynamic effects and the slip, on the one hand, and the noise development, on the other hand.

It would therefore be desirable and advantageous to provide an improved tensioner which obviates prior art shortcomings and which allows a continuous adjustment of the biasing force and thus tension of the traction member to the load of the accessory and the operating phase of the internal combustion machine, regardless of the speed pattern, i.e. to reduce the biasing force at high rotation speed and to increase the biasing force at low rotation speed.

SUMMARY OF THE INVENTION

According to one aspect of the present invention, a tensioner for a traction member, in particular a belt of a traction drive for an internal combustion engine, includes a base connected to a tensioner arm, with the tensioner arm having a free end for connection of a rotatable tension roller which bears against a traction member, a spring member urging the tensioner arm to seek a forced engagement of the tension roller upon the traction member, a damping element disposed between the base and the tensioner arm for damping an adjusting movement of the tensioner arm, a pivot bearing swingably supporting the base on a machine part for rotation about the rotation axis, an actuator supporting the base on the machine part and acting on the base for rotation about the rotation axis, and a control unit for controlling an effective length of the actuator to thereby adjust a biasing force of the traction member.

The present invention resolves prior art problems by providing an actuator between the machine part and the base, with the actuator having an adjustable or variable effective length. As a consequence, the traction member can be biased in response to the respective operating state or phase of the internal combustion engine, by simply adjusting the actuator accordingly. The provision of an actuator with variable effective length thus enables a desired adjustment of the tension of the traction member.

According to another feature of the present invention, the effective length of the actuator may be changed in dependence of a rotation speed or speed of the traction member and/or the operating phase of the internal combustion engine so as to adjust the biasing force in the traction drive. Suitably, the actuator includes a control system for adjusting the effective length.

Thus, unlike conventional tensioners that are dimensioned for maximum load, a tensioner according to the invention eliminates excessive tension of the traction member or belt. Thus, an increased biasing force of the traction member can thus be applied, when necessary, e.g. during the start-up phase or at high unit loads, or a lower biasing force can be applied, when the accessories operate at reduced loads. This adjusting capability of the tension of the traction member satisfies a long felt need by the automobile manufacturer or end consumer and results extended life of the traction member and belts. Moreover, a tensioner according to the present invention is ideal for traction drives that include a belt-driven starter generator, and is simple in structure so as to allow easy modification of existing tensioners by adding an actuator in accordance with the present invention.

Advantageously, the present invention is applicable for a traction drive of an internal combustion engine which includes a belt-operated starter generator. The accessory meets two functions. During the start-up phase, the starter generator in the form of an electric motor drives the internal combustion engine. Subsequently, while the internal combustion engine runs, the starter generator switches to a generator mode for supply of electric energy for the on-board electrical system of the motor vehicle. Depending on the operating mode of the internal combustion engine, a torque is introduced from the starter generator or the internal combustion engine via the respective pulleys into the traction member. As a result, there is a change of the idle strand and the pulling strand and a change in the torque direction in the traction member between the pulleys of the crankshaft and the starter generator. Through use of an actuator according to the invention, a high enough biasing force can be realized in the traction member also in the start-up phase so as to ensure a slip-free, rapid start of the internal combustion engine.

According to another feature of the present invention, there may be provided an electronic system for controlling the actuator in response to at least one ascertained parameter for adjusting the biasing force of the traction member. Examples of the parameter include generator power, biasing force of the traction member, operating direction of a torque in the traction member, rotation speed of a pulley of the traction drive, and reset moment of an electric motor. It is also possible to change the effective length of the actuator in dependence on a reset moment of an electric motor, used, for example, for operating a ball screw mechanism. The high generator output established in the start-up mode is hereby directly converted to shift the actuator and thus the tensioner into a position that increases the biasing force of the traction member. The parameter(s) can be determined by sensors or other devices.

According to another feature of the present invention, the actuator may be constructed so as to be movable in at least two positions. In other words, the actuator is constructed for movement between a retracted end position and an extended end position. As an alternative, the actuator may also be constructed so as to have an infinitely adjustable effective length.

According to another feature of the present invention, the actuator may include a ball screw mechanism. Suitably, the ball screw mechanism is operated by an electric motor so that the effective length of the actuator can be precisely adjusted. As an alternative, the actuator may also be constructed to include a hydraulically or pneumatically operating control element, or an electromagnetically or electrohydraulically operating control element.

According to another feature of the present invention, the base can be so positioned that a geometric disposition of the pivot bearing between the base and the machine part affects the biasing force of the traction member. When the pivot bearing is suitably positioned, the position of tension roller remains substantially constant, regardless of the effective length of the actuator, while still influencing the tension of the traction member. This construction is especially advantageous in starter generator mode so that a high biasing force of the traction member can be realized which may theoretically be infinite so long as the resultant lever arm approaches zero, without change in position of the tension roller. The position of the pivot bearing for the base coincides hereby with the pivot point of the tension roller. As a consequence of this positional coincidence, there is no resultant lever arm between the pivot points of the base and the tension roller.

As an alternative to the direct securement of the actuator to the base of the tension, it is, of course, also conceivable to provide an indirect securement of the actuator. An example includes the provision of a toggle lever having ends mounted to the machine part and the base, with the actuator secured in the area of the toggle lever. In this way, the actuator force can be multiplied, thereby positively affecting the design of the actuator or the dimension of the control element. Suitably, the toggle lever is able to impact against a stop member in one end position to thereby realize a precise position of the toggle lever and a defined position of the connected base of the tensioner.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 8:
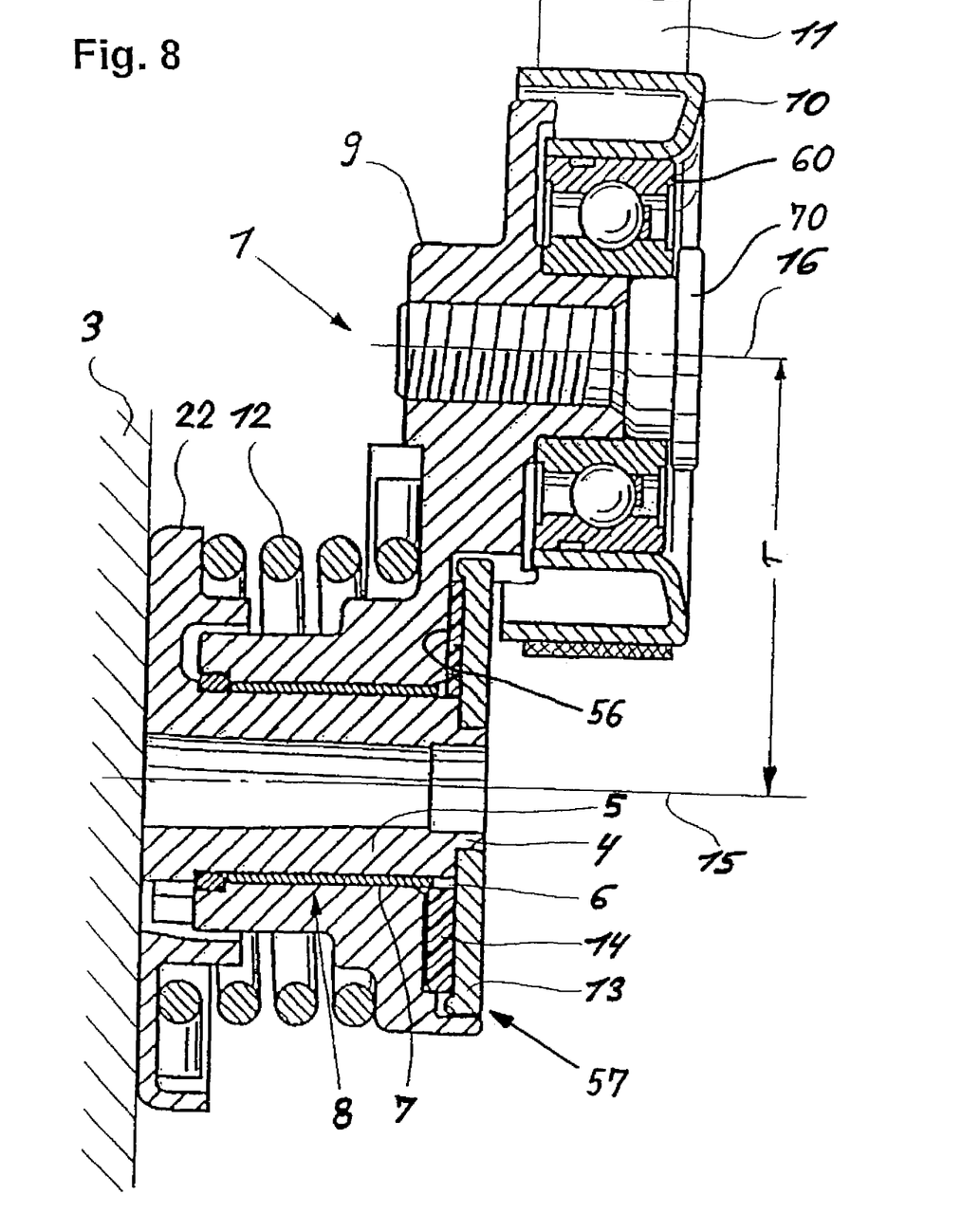
FIG. 8 is a longitudinal section of a basic configuration of a tensioner which can be complemented with the subject matter in accordance with the present invention.

Turning now to the drawing, and first to FIG. 8, there is shown is a longitudinal section of a basic configuration of a tensioner 1 which can be complemented with the subject matter in accordance with the present invention. The tensioner 1 includes a base 22 which is fixedly secured to a machine part 3. The base 22 is formed in one piece with an axially extending cylindrical pin 4 which is surrounded in concentric radially spaced-apart relationship by a hub 5. Mounted in the hub 5 is a shaft 8 for rotation about a rotation axis which coincides with a symmetry axis 15. An annular gap 6 is radially defined by the hub 5 and the pin 4 for receiving a slide bearing in the form of a friction or bearing bushing 7 to thereby rotatably support the shaft 8. The hub 5 is part of a tensioner arm 9 having a free end for attachment of a rotatable tension roller 10 which is supported by a rolling-contact bearing 60. A bolt 70 connects the slide bearing to the tensioner arm 9. The tension roller 10 rotates about a rotation axis 16 which is spaced from the symmetry axis 15 by a radius r. Disposed between the base 22 and the tensioner arm 9 is a torsion spring 12 which surrounds the shaft 8 and forces the tension roller 10 into resilient abutment against a traction member 11, e.g. a belt. Securely mounted to one end of the pin 4 is a ring flange 13 which absorbs an axial force applied by the torsion spring 12. The hub 5 is hereby supported via a sliding disk 14 upon the ring flange 13, whereby the sliding disk 14 is disposed between the rina flanae 13 and an end surface 56 of the tensioner arm 9 and assumes at the same time the function of a damping element, generally designated by reference numeral 57.

Figure 1:
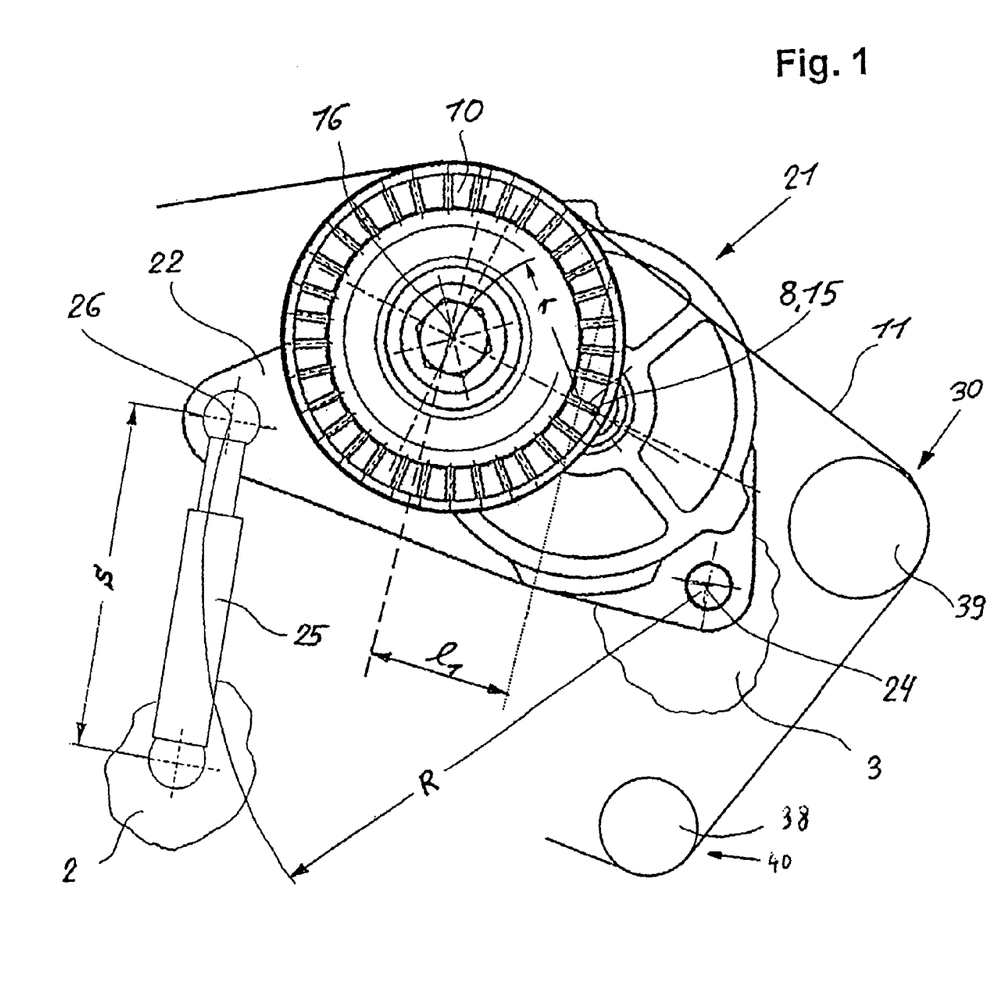
FIG. 1 is a general view of one embodiment of a tensioner according to the present invention including an actuator assuming a neutral position.

Referring now to FIG. 1, there is shown a general view of one embodiment of a tensioner according to the present invention, generally designated by reference numeral 21. Parts corresponding with those in FIG. 8 are denoted by identical reference numerals and not explained again. The description below will center on the differences between the embodiments. In this embodiment, provision is made for a base 22 which is swingably mounted to the machine part 3 and supported by a pivot bearing for rotation about a rotation axis 24. The tension roller 10 is here constructed in a same way as shown in FIG. 8 and is connected to the tensioner arm 9 (not shown in FIG. 1). Linked to the base 22 at an attachment point 26 at a distance to the rotation axis 24 is one end of an actuator 25 whose other end is linked to the machine part 3. The actuator 25, also called control element, has a variable effective length s and thus impacts directly the biasing force of the traction member 11. Thus, tensioner 21 is so constructed as to allow a change in the geometry of the entire arrangement and thus a direct influence of the biasing force of the traction member 11 through combination of the pivot bearing 24, which is fixedly connected to the machine part 3 or housing of an internal combustion engine and represents a pivot of the tensioner 21, and the adjustment capability by means of the actuator 25.

The tensioner 21 has two lever arms, one lever arm R between the pivot bearing 24 of the base 22 and the attachment point 26 of the actuator 25 upon the base 22, and the other lever arm r (see also FIG. 8) between the rotation axis 16 of the tension roller 10 and the symmetry axis 15 of the base 22. These two different lever arms R, r result in a variable, effective lever arm $l_1$ through variation of the lever arm R.

FIG. 1 further shows the provision of an accessory in the form of a starter generator 30, represented here only symbolically, which is connected via a pulley 38 with the traction member 11 and thus the traction drive. Depending on the operating mode, the starter generator 30 provides a start-up function or a generator function. Hereby, this accessory changes between driving and driven phase. As a result, there is also a change of idle strand and pulling strand between the pulleys 38, 39 of the starter generator 30 and the crankshaft 40 of an internal combustion engine (not shown).

Figure 2:
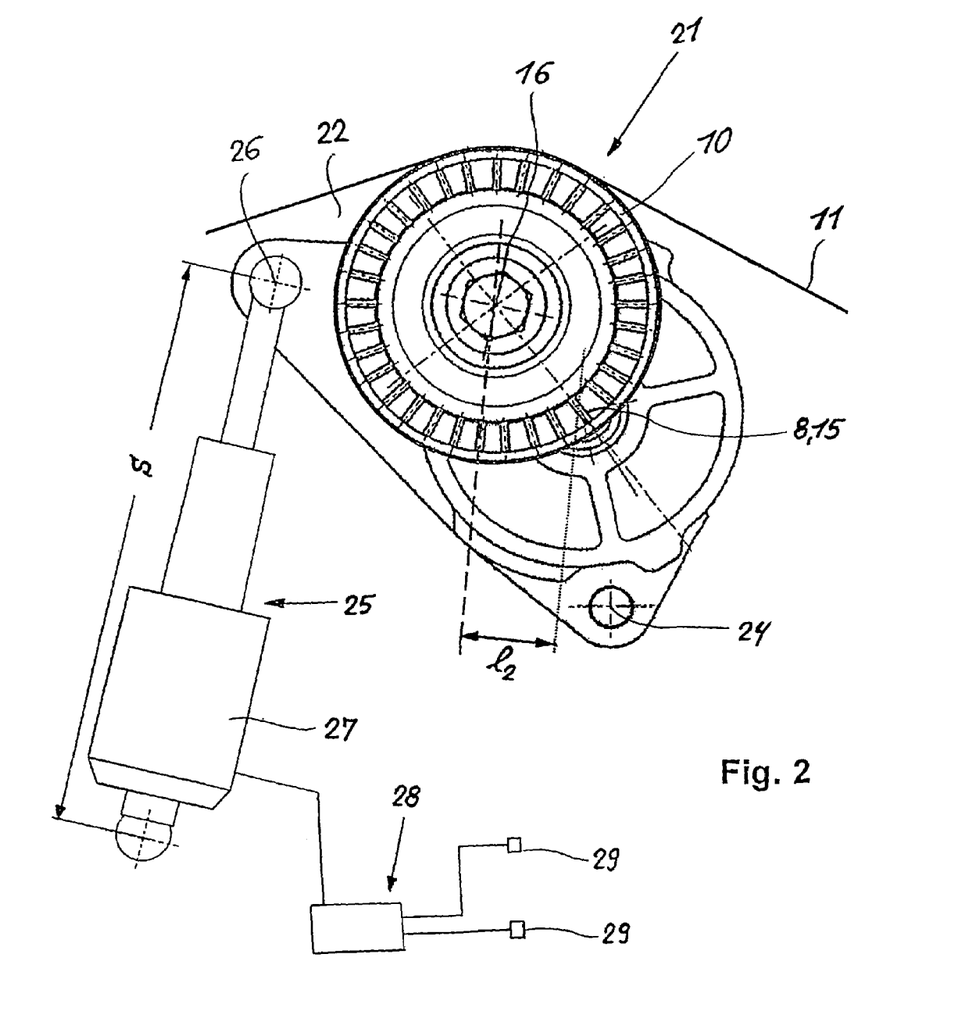
FIG. 2 is a general view of the tensioner of FIG. 1 with the actuator assuming an extended end position.

While the actuator 25 is shown in neutral position in FIG. 1, FIG. 2 shows the actuator 25 in extended disposition. The change in actuator length results in a change of the effective lever arm, designated her by $l_2$, which is now shorter than the lever arm 11. As a result, the torsion spring 12 is under greater spring tension and thus increases the tension of the traction member 11.

Figure 7:
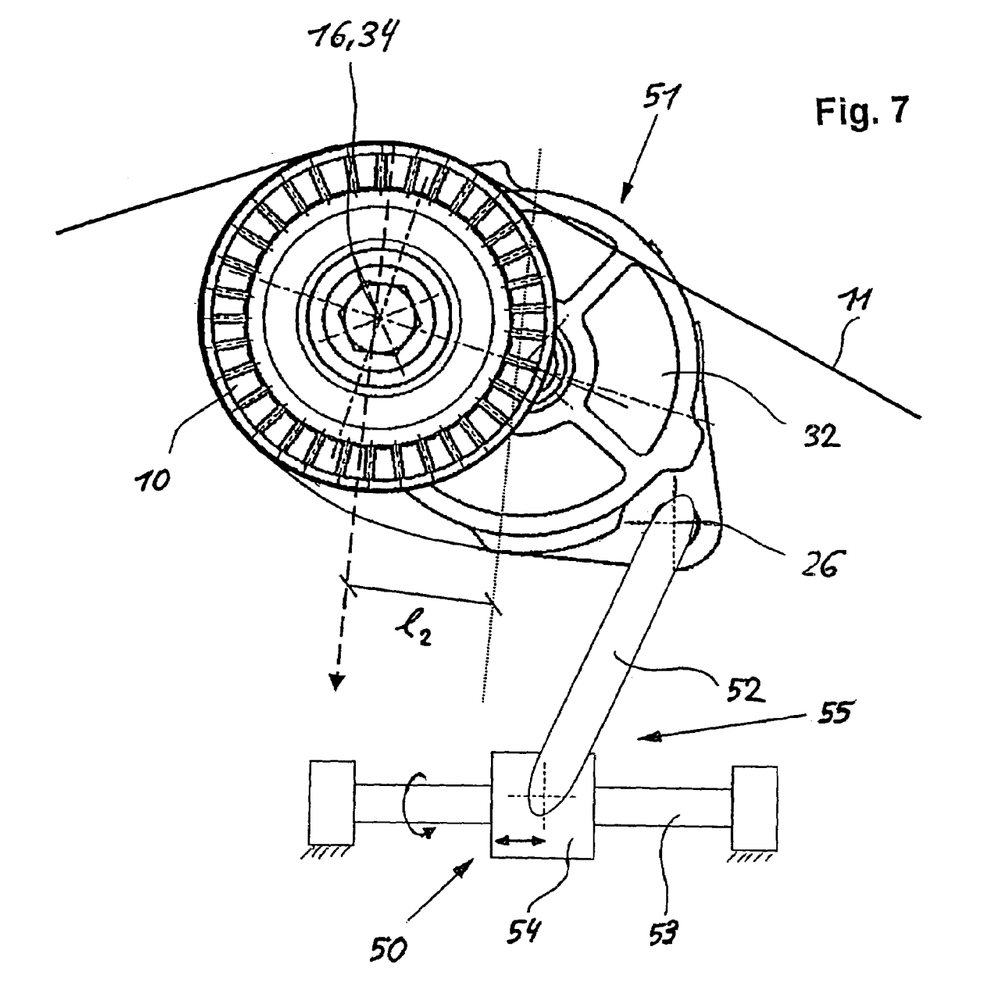
FIG. 7 is a general view of still another embodiment of a tensioner according to the present invention.

The actuator 25 includes an electric adjustment drive 27 which allows a continuous adjustment of the tensioner 21 and includes an electronic control unit 28 operatively connected to one or more sensors 29 for determination of one or more parameters, such as, for example, generator power, biasing force of the traction member 11, operating direction of a torque in the traction member 11, rotation speed of a pulley of the traction drive. Each sensor 29 transmits a signal to the control unit 28 for adjusting the adjustment drive 27 accordingly to thereby change the effective length s of the actuator 25 and adjust the biasing force of the traction member 11. As an alternative, it is also possible to evaluate the reset element of the electric motor in connection with a ball screw mechanism, as shown in FIG. 7.

Figure 3:
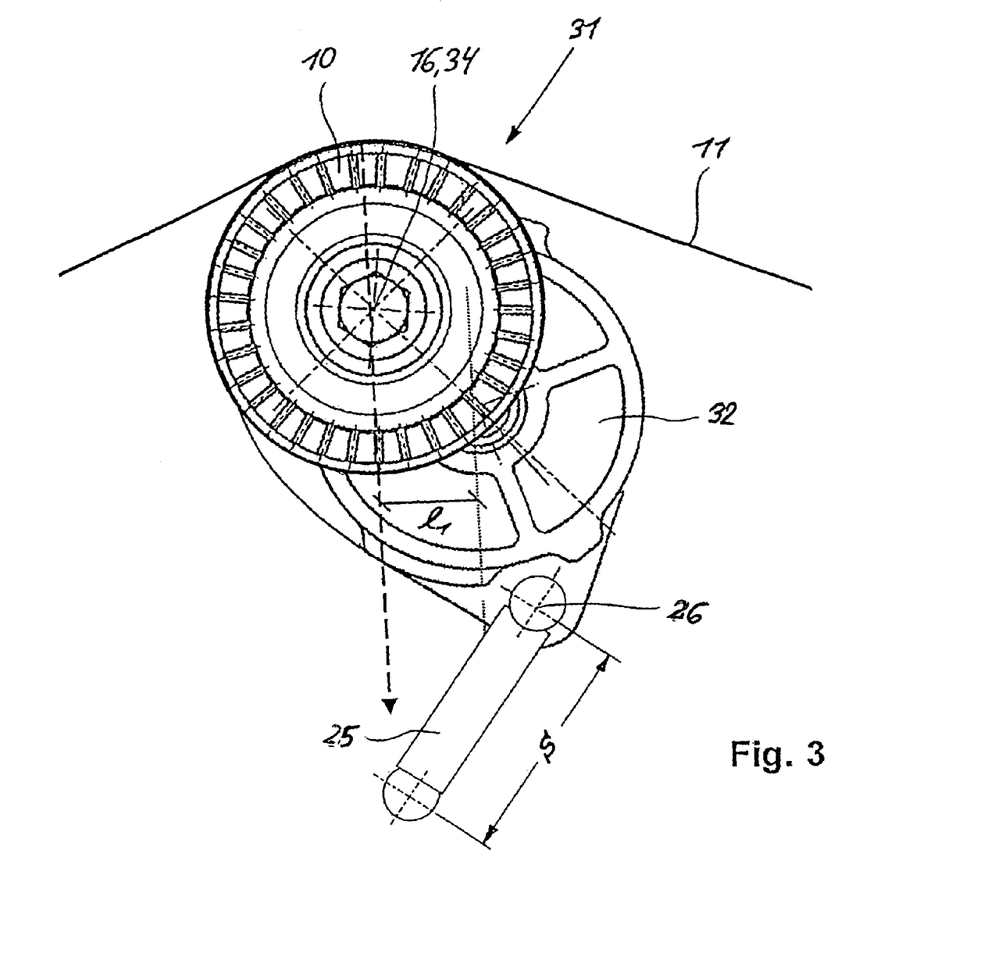
FIG. 3 is a general view of another embodiment of a tensioner according to the present invention, including an actuator assuming a retracted end position
Figure 4:
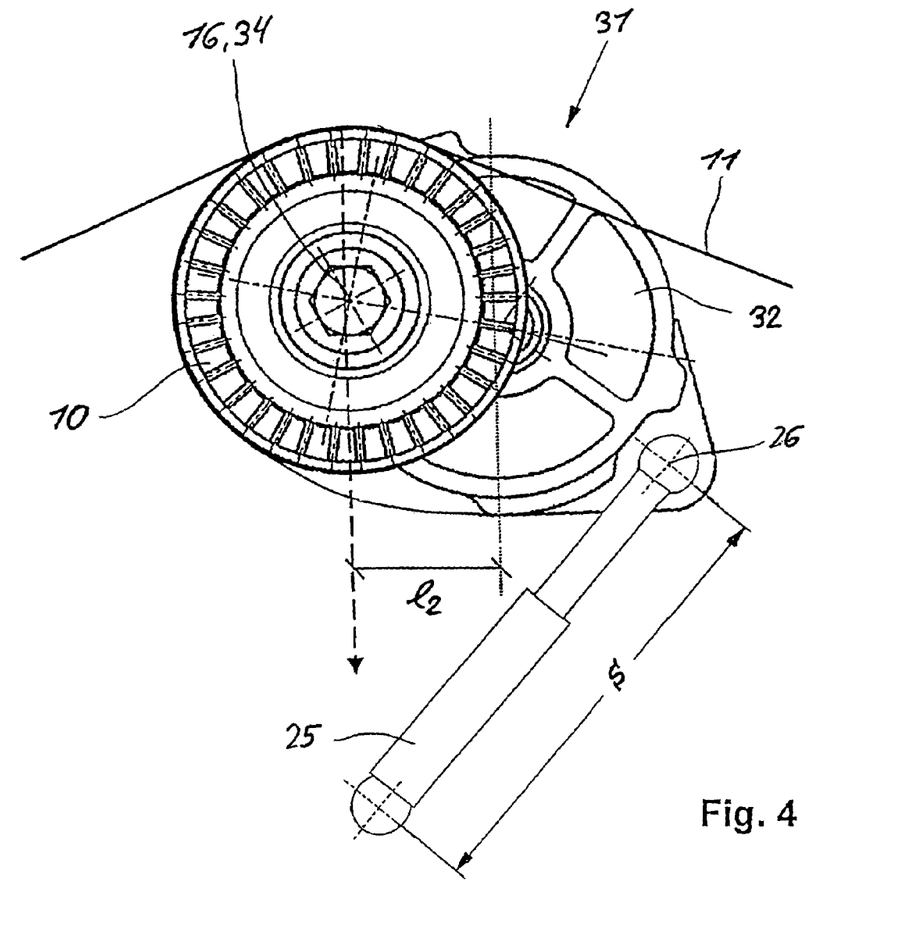
FIG. 4 is a general view of the tensioner of FIG. 3 with the actuator assuming an extended end position.

Turning now to FIG. 3, there is shown a general view of another embodiment of a tensioner according to the present invention, generally designated by reference numeral 31. Parts corresponding with those in FIG. 8 are again denoted by identical reference numerals and not explained again. The description below will center on the differences between the embodiments. In this embodiment, the tensioner 31 has a base 32 which is so configured that its pivot bearing 34 is in substantial coincidence with the rotation axis 16 of the tension roller 10, at least in a nominal position of the tensioner 31. The actuator 25 is shown in FIG. 3 in a retracted end position, whereas FIG. 4 shows the actuator 25 in the extended end position. A comparison between FIGS. 3 and 4 shows that the position of the tension roller 10 remains substantially unchanged. In other words, the unchanged disposition of the rotation axis 16 of the tension roller 10, regardless of the effective length s of the actuator 25, means that the biasing force of the torsion force 12 remains unaltered; however, the effective lever arm can be varied.

Depending on the position, it is possible to set a lever arm length near zero so as to establish a quasi rigid tension roller 10. Such a tension roller 10 does not form a resultant lever arm, thereby realizing a substantial biasing force of the traction member which can be infinite, without shift of the rotation axis 16 of the tension roller 10. As a consequence of a rotation of the base 32, a changed and increased spring tension of the traction member 11 can be realized.

The tensioner 31 is especially suitable for application as starter generator. While maintaining geometric conditions, in particular the wrap around angle of the traction member 11 upon the pulleys of the traction drive, the required higher biasing force can be realized in the traction member 11 during the start-up phase of the internal combustion engine.

Figure 5:
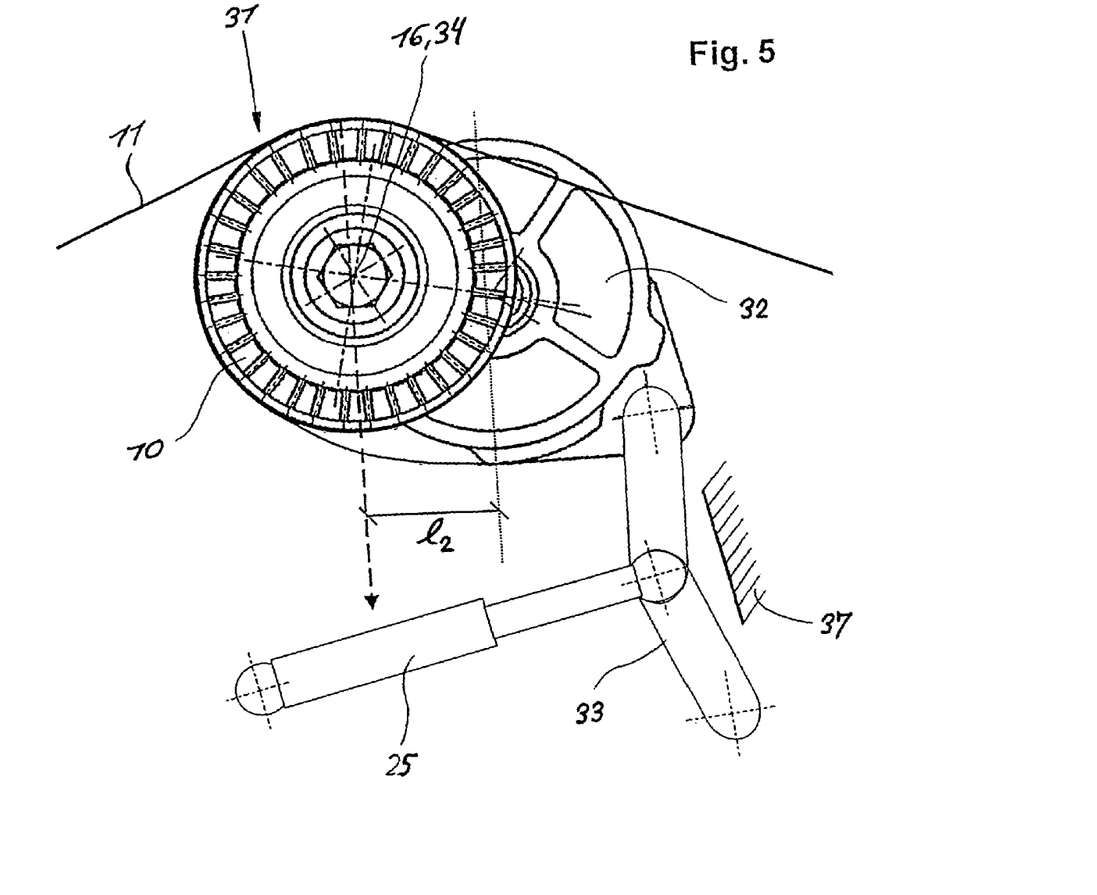
FIG. 5 is a general view of still another embodiment of a tensioner according to the present invention.

FIG. 5 shows a modification of the tensioner 31 of FIG. 3, with the difference residing in the configuration of the actuator 25 which is linked to the base 32 via a toggle lever 33. As a result, the force applied by the actuator 25 is multiplied. A defined end position of the actuator 25, when the actuator 25 assumes the extended position, is realized by the provision of a stop member 37 which is impacted by the toggle lever 33.

Figure 6:
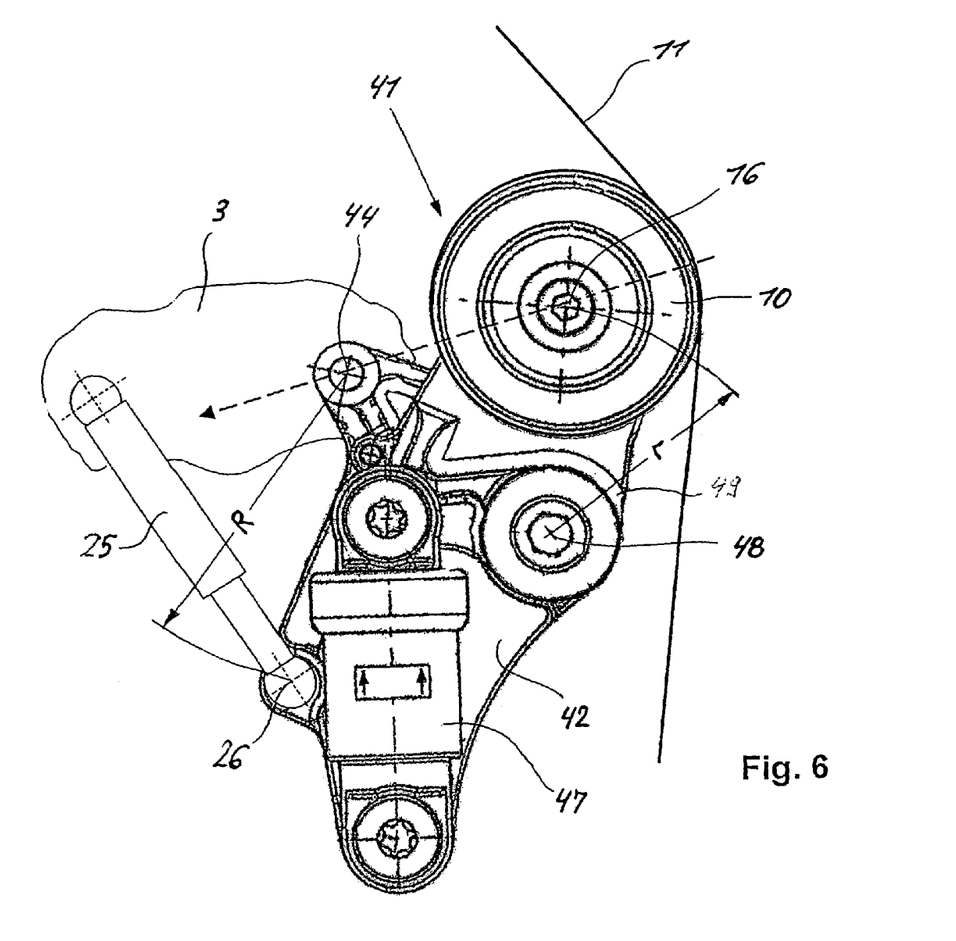
FIG. 6 is a general view of still another embodiment of a tensioner according to the present invention.

Turning now to FIG. 6, there is shown a general view of still another embodiment of a tensioner according to the present invention, generally designated by reference numeral 41. Parts corresponding with those in FIG. 8 are again denoted by identical reference numerals and not explained again. The description below will center on the differences between the embodiments. In this embodiment, provision is made of a hydraulic mechanical adjusting member 47 of conventional structure, instead of the torsion spring, to ensure a spring-biased tension roller 10 upon the traction member 11. The tensioner 41 has a tensioner arm 49 which is swingably connected via a rotation shaft 48 with a base 42. The adjusting member 47 is articulated to the base 42 in offset relationship to the rotation shaft 48. The tension 41 further includes a pivot bearing 44 for swingably supporting the base 42 in relation to the machine part 3. The actuator 25 adjusts also in this construction the position of the base 42 and thus the biasing force of the traction member 11.

Turning now to FIG. 7, there is shown a general view of still another embodiment of a tensioner according to the present invention, generally designated by reference numeral 51. Parts corresponding with those in FIG. 8 are again denoted by identical reference numerals and not explained again. The description below will center on the differences between the embodiments. In this embodiment, the tensioner 51 includes an actuator in the form of a ball screw mechanism 50 which includes a rotatable screw 53 having opposite ends which are each swingably supported. The screw 53 is operated by an electric motor (not shown). Rotation of the screw 53 results in an axial displacement of a nut 52 in a direction depending on the rotation direction of the screw 53. The nut 54 is form-fittingly mounted to the screw 52 and is connected to one end of a lever 52 whose other end is swingably mounted at attachment point 26 to the base 32. Thus, an axial movement of the nut 54 is transmitted via the lever 52 onto the base 32 to thereby adjust the biasing force of the traction member 11 via the pivoting base 32. The ball screw mechanism prevents a direct transmission of the biasing force onto the nut 54. Rather, the biasing force is introduced as bending moment into the screw 53. As a result, a smaller driving moment of the screw 53 is established. In other words, the electric motor for operating the screw 53 requires a relatively small holding current.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A tensioner for a traction member, comprising:
   a base connected to a tensioner arm, said tensioner arm having a free end for connection of a rotatable tension roller which bears against a traction member;
   a ring flange secured to a pin of the base;
   a spring member urging the tensioner arm to seek a forced engagement of the tension roller upon the traction member;
   a sliding disk disposed between the ring flange and an end surface of the tensioner arm to define a damping element for damping an adjusting movement of the tensioner arm;
   a pivot bearing swingably supporting the base on a machine part for rotation about the rotation axis;
   an actuator supporting the base on the machine part and acting on the base for rotation about the rotation axis; and
   a control unit for controlling an effective length of the actuator to thereby adjust a biasing force of the traction member.

2. The tensioner of claim 1, wherein the control unit includes an electronic system for controlling the actuator in response to at least one ascertained parameter for adjusting the biasing force of the traction member.

3. The tensioner of claim 2, wherein the electronic system controls the effective length of the actuator in response to the determined parameter, wherein the at least one parameter is selected from the group consisting of generator power, biasing force of the traction member, operating direction of a torque in the traction member, rotation speed of a pulley of the traction drive, and reset moment of an electric motor.

4. The tensioner of claim 2, wherein the actuator is constructed so as to be movable in at least two positions.

5. The tensioner of claim 2, wherein the actuator is constructed so as to enable a continuous adjustment of a position of the actuator.

6. The tensioner of claim 1, wherein the actuator includes a ball screw drive.

7. The tensioner of claim 1, wherein the actuator is constructed to include a hydraulically or pneumatically operating control element.

8. The tensioner of claim 1, wherein the actuator is constructed to operate electromagnetically or electro-hydraulically.

9. The tensioner of claim 1, wherein the base is so positioned that a geometric disposition of the pivot bearing between the base and the machine part affects the biasing force of the traction member.

10. The tensioner of claim 1, wherein the actuator is connected via a toggle lever with the base.

11. The tensioner of claim 10, wherein the toggle lever is positioned against a stop member in one end position.

12. A tensioner for a traction drive, comprising:
    a base swingably mounted to a fixed machine part of the traction drive for rotation about a pivot and supporting a tensioner arm;
    a ring flange secured to a pin of the base;
    a tension roller mounted on a base-distal end of the tensioner arm and bearing against a traction member;
    an actuator for rotating the base about the pivot to thereby adjust a tension of the traction; and
    a slidin disk disposed between the ring flange and an end surface of the tensioner arm to define a damping element for damping an adjusting movement of the base and the tensioner arm.

13. The tensioner of claim 12, wherein the actuator is connected to the base at an attachment point at a distance to the pivot for defining a first lever arm, said tension roller defining a rotation axis at a distance to a symmetry axis of the base to define a second lever arm.

14. The tensioner of claim 13, wherein the rotation axis of the tension roller and the pivot are in substantial coincidence.

15. The tensioner of claim 12, wherein the actuator includes a control system having a sensor for determining an operating parameter of the traction drive and operating the actuator in response to the determined parameter for adjusting the tension of the traction member.

16. The tensioner of claim 12, wherein the actuator has a connecting rod having one end secured to the base and movable between a retracted end position and an extended end position.

17. The tensioner of claim 12, wherein the actuator is connected via a toggle lever with the base to realize a multiplication of a force applied upon the base.

18. The tensioner of claim 12, wherein the actuator is implemented in the form of a ball screw mechanism.

* * * * *